United States Patent
Cho et al.

(10) Patent No.: US 11,797,679 B2
(45) Date of Patent: Oct. 24, 2023

(54) TRUST VERIFICATION SYSTEM AND METHOD FOR A BASEBOARD MANAGEMENT CONTROLLER (BMC)

(71) Applicant: Dell Products, L.P., Round Rock, TX (US)

(72) Inventors: Eugene David Cho, Austin, TX (US); Mario Alberto Sanchez, Austin, TX (US); Akkiah Choudary Maddukuri, Austin, TX (US); Marshal F. Savage, Austin, TX (US); Paul W. Vancil, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 257 days.

(21) Appl. No.: 17/386,779

(22) Filed: Jul. 28, 2021

(65) Prior Publication Data
US 2023/0034526 A1    Feb. 2, 2023

(51) Int. Cl.
*G06F 1/24*         (2006.01)
*G06F 21/57*        (2013.01)
*G06F 21/64*        (2013.01)
*G06F 21/53*        (2013.01)
*G06F 11/07*        (2006.01)
*G06F 21/60*        (2013.01)
*G06F 9/4401*       (2018.01)

(52) U.S. Cl.
CPC ........ *G06F 21/572* (2013.01); *G06F 11/0772* (2013.01); *G06F 21/53* (2013.01); *G06F 21/575* (2013.01); *G06F 21/602* (2013.01); *G06F 21/64* (2013.01); *G06F 9/4401* (2013.01); *G06F 2221/2149* (2013.01)

(58) Field of Classification Search
CPC .... G06F 21/572; G06F 11/0772; G06F 21/53; G06F 21/575; G06F 21/602; G06F 21/64; G06F 2221/2149; G06F 11/1417
USPC .............................................................. 713/2
See application file for complete search history.

(56) References Cited

U.S. PATENT DOCUMENTS

| | | | |
|---|---|---|---|
| 11,238,159 B1 * | 2/2022 | Clark-Lindh | ......... G06F 21/572 |
| 2007/0288740 A1 * | 12/2007 | Dale | .................... G06F 9/4405 |
| | | | 713/2 |
| 2007/0300053 A1 * | 12/2007 | Dale | ........................ H04L 9/08 |
| | | | 713/2 |
| 2011/0258426 A1 * | 10/2011 | Mujtaba | .................. G06F 21/57 |
| | | | 713/168 |
| 2015/0227427 A1 * | 8/2015 | Soderlund | ........... G06F 11/1438 |
| | | | 714/15 |

(Continued)

FOREIGN PATENT DOCUMENTS

CN          108363918 A   *   8/2018   ............. G06F 21/51

*Primary Examiner* — Volvick Derose
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes instructions for executing a bootloader to verify an integrity of a first firmware stack, and boot the first firmware stack on a first processor. Once booted, the first firmware stack verifies the integrity of a first code segment on a second processor that is also used to execute a custom BMC firmware stack. The first code segment is executed to verify the integrity of one or more vendor supplied code segments executed on the second processor.

18 Claims, 8 Drawing Sheets

(56) References Cited

U.S. PATENT DOCUMENTS

| | | | |
|---|---|---|---|
| 2016/0182238 A1* | 6/2016 | Dewan | H04L 9/321 |
| | | | 713/193 |
| 2016/0216978 A1* | 7/2016 | Dangy-Caye | G06F 11/1433 |
| 2019/0102558 A1* | 4/2019 | de Cesare | G06F 21/575 |
| 2019/0266331 A1* | 8/2019 | Sanchez Diaz | G06F 21/51 |
| 2020/0081708 A1* | 3/2020 | Miyamoto | G06F 9/3877 |
| 2021/0034376 A1* | 2/2021 | Kalla | G06F 9/4416 |
| 2021/0042035 A1* | 2/2021 | Futagi | G06F 11/1469 |
| 2021/0326443 A1* | 10/2021 | Plaquin | G06F 21/572 |
| 2022/0197746 A1* | 6/2022 | Chu | G06F 8/65 |
| 2022/0284105 A1* | 9/2022 | Krishnegowda | G06F 3/0679 |

* cited by examiner

TRUST VERIFICATION SYSTEM AND METHOD FOR A BASEBOARD MANAGEMENT CONTROLLER (BMC)

FIELD

The present disclosure generally relates to electronics, and, more particularly, to a trust verification system and method for a baseboard management controller (BMC).

BACKGROUND

As the value and use of information continues to increase, individuals and businesses seek additional ways to process and store information. One option available to users is information handling systems (IHSs) to be general or configured for a specific user or specific use such as financial transaction processing, airline reservations, enterprise data storage, or other systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information aware communications. In addition, information handling systems may include a variety of hardware and software components that may be configured to process, store, and communicate information and may include one or more computer systems, data storage systems, and networking systems.

In modern day IHSs, administrative management is often provided via Baseboard Management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (OS) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung OS running again. These abilities save on the total cost of ownership of an IHS.

SUMMARY

An Information Handling System (IHS) includes multiple hardware devices, and a baseboard Management Controller (BMC) in communication with the plurality of hardware devices. The BMC includes instructions for executing a bootloader to verify an integrity of a first firmware stack, and boot the first firmware stack on a first processor. Once booted, the first firmware stack verifies the integrity of a first code segment on a second processor that is also used to execute a custom BMC firmware stack. The first code segment is executed to verify the integrity of one or more vendor supplied code segments executed on the second processor.

According to another embodiment, a method includes the steps of executing a bootloader to verify an integrity of a first firmware stack on a baseboard management controller (BMC), and boot the first firmware stack on a first processor of a baseboard management controller. The method further includes the steps of executing the first firmware stack to verify the integrity of a first code segment which is then executed on a second processor of the BMC. The first code segment is executed to verify the integrity of one or more vendor supplied code segments executed on the second processor.

According to yet another embodiment, a baseboard management controller (BMC) includes computer executable instructions for executing a bootloader to verify an integrity of a first firmware stack, and boot the first firmware stack on a first processor. The first firmware stack may then be executed to verify the integrity of a first code segment that is executed on a second processor that is also used to execute a custom BMC firmware stack. The first code segment may then be executed to verify the integrity of one or more vendor supplied code segments executed on the second processor.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
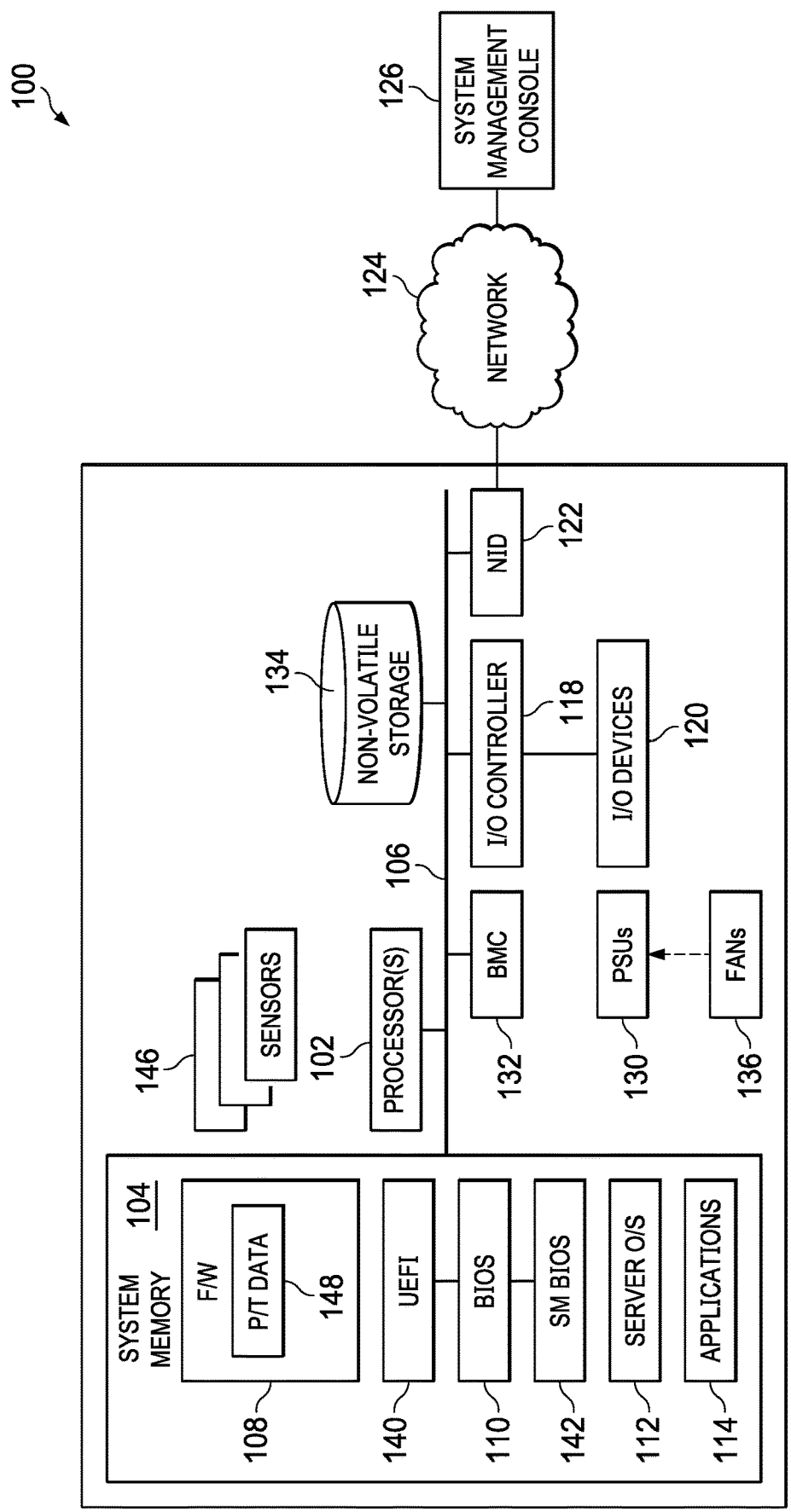
FIG. 1 is a block diagram of examples of components of an Information Handling System (IHS) that may be used to implement a trust verification system according to some embodiments.

Embodiments of the present disclosure provide a trust verification system and method for ensuring that code used in an end-user's runtime environment of a baseboard management controller (BMC) remains trusted. Whereas current BMC implementations have enabled the use of user supplied custom BMC firmware, such as via an openBMC standard, non-custom (e.g., supervisory or administrative) segments of code existent on the BMC, which has enabled the use of the custom BMC firmware, may be vulnerable due at least in large part, to the uncontrolled nature in which the custom BMC firmware is developed and deployed on the BMC. Embodiments of the present disclosure provide a solution to these problems, among others, using a trust verification system where the non-custom code segments existent on the BMC may be verified using a hierarchical root of trust technique using proprietary components of the BMC.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL TECHNOLOGIES. On the other hand, custom BMC firmware stacks, which are typically developed in uncontrolled environments, often possess relatively higher levels of software faults (e.g., bugs). Additionally, since custom BMC firmware stacks may be created and implemented with little or no control over how the BMC hardware or its associated IHS is configured, they may exhibit certain problems that, if not resolved, can inflict damage to the IHS or even the BMC hardware itself.

This drawback can be particularly problematic due to the fact that custom BMC firmware stacks are inherently less secure than their standard BMC firmware stack counterparts. For example, custom BMC firmware stacks are typically created by users whose development efforts are not closely controlled by the vendor of the IHS and as such, it may include logic that may not be aware of all of the intricacies of the IHS it is designed to manage. Furthermore, such logic can engender security holes that may enable others to breach the security of the BMC or even its host IHS.

Improperly functioning algorithms, whether inadvertent or malicious, can ruin or damage their respective IHSs if not properly mitigated. For example, whereas BMCs may be configured to control the fan speed of any number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components.

To alleviate the problems associated with custom BMC implementations, online assistance services have been developed that provide a supervisory or monitoring role for custom BMC firmware stacks. The online assistance service may be concurrently executed with the custom BMC firmware stacks to monitor certain operating parameters of the BMC and/or its associated IHS, and provide appropriate warnings and/or corrective actions when problems are identified. One example online assistance service may include or may be part of an INTELLIGENT ADVISOR online software monitoring service provided by DELL TECHNOLOGIES. The INTELLIGENT ADVISOR online software monitoring service may include agent software loaded along with the custom BMC firmware stack in the user space of the BMC's memory. Additionally, the INTELLIGENT ADVISOR online software monitoring service provides a portal that provides for downloading of assistance applications (APPs) (e.g., vendor supplied APPs) that assist the INTELLIGENT ADVISOR with localized monitoring and/or corrective action services.

Nevertheless, the use of an online assistance service still causes problems when used with custom BMC firmware stacks. For example, malicious code in the custom BMC firmware stack can corrupt the agent software or its associated online assistance services by illicitly modifying its code, thus yielding a loss of trust in the validity of the online assistance service or its local vendor supplied APPs. The BMC may also include other processors, such as a coprocessor that may execute proprietary code that can potentially be illicitly modified by a custom BMC firmware stack. It would be beneficial to ensure that non-custom (proprietary) code such as described above is protected from the custom BMC firmware stack using a trust system where the non-custom code can be verified to ensure it has not been modified. For example, warranty agreements established between the vendor of the IHS and its end user may be based on a source of any problems that may arise during use of the IHS. Since custom BMC firmware stacks possess a propensity for such behavior, it would be beneficial to ensure the authenticity of non-custom code segments implemented on a BMC. It is with these concerns in mind, among others, that embodiments of the present disclosure are provided herein.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS) that may be used to implement a trust verification system according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
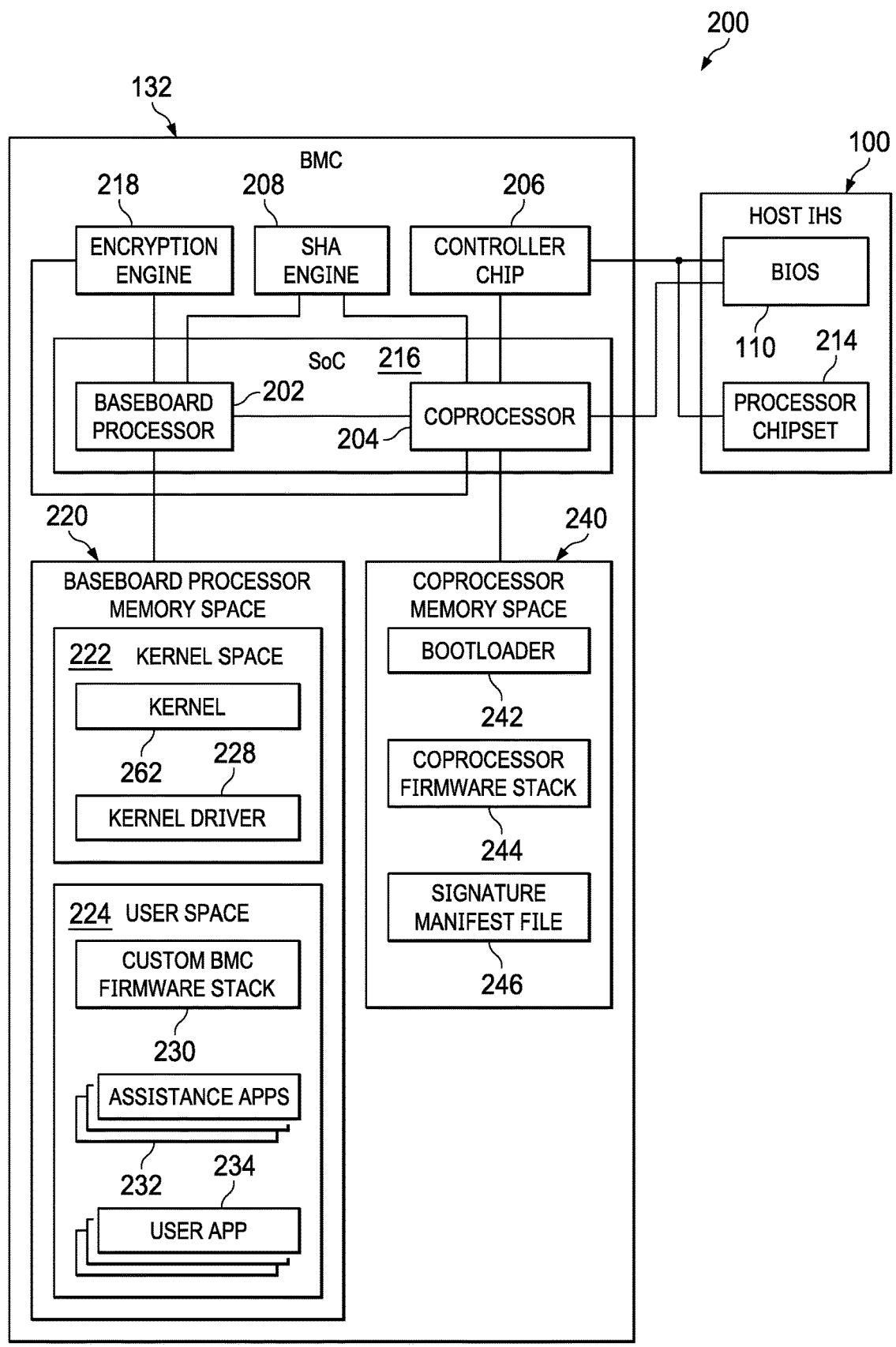
FIG. 2 is a diagram illustrating several components of an example BMC along with those of an associated IHS that may be used to implement a trust verification system according to one embodiment of the present disclosure.

FIG. 2 is a diagram illustrating several components of an example BMC 132 along with those of an associated IHS 100 that may be used to implement a trust verification system 200 according to one embodiment of the present disclosure. The BMC 132 generally includes a baseboard processor 202, a coprocessor 204, a controller chip 206, a secure hash algorithm (SHA) engine 208, an encryption engine 218, a baseboard processor memory space 220, and a coprocessor memory space 240. The IHS 100 on the other hand, is shown including a BIOS 110, and a processor chipset 214. As shown, the baseboard processor 202 and coprocessor 204 may be provided together in a system on chip (SoC) device 216. In other embodiments, the baseboard processor 202 and coprocessor 204 may be provided as discreet entities.

The baseboard processor 202 is coupled to a baseboard processor memory space 220 that includes a kernel space 222 and a user space 224. The kernel space 222, in turn, stores a kernel 226 and a kernel driver 228, while the user space 224 stores a custom BMC firmware stack 230, and one or more vendor supplied APPs 232. In general, the kernel 226 performs tasks, such as low level algorithms (e.g., managing hardware devices, handling interrupts, etc.) associated with the operation of the BMC 132. The kernel 226 is inaccessible from processes running within the user space 224 directly; nevertheless, those processes may access the kernel 226 by invoking system calls to it. The kernel driver 228 is also stored in the kernel space 222 and is thus protected from access by processes running in the user space 224 of the baseboard processor memory space 220. In one embodiment, the kernel driver 228 provides at least a part of an online assistance service that provides a supervisory or monitoring role for custom BMC firmware stacks. The online assistance service may be concurrently executed with the custom BMC firmware stacks to monitor certain operating parameters of the BMC and/or its associated IHS, and provide appropriate warnings and/or corrective actions when problems are identified. One example online assistance service may include or may be part of an INTELLI- GENT ADVISOR online software monitoring service provided by DELL TECHNOLOGIES. Additional details associated with the kernel driver 228 will be described in detail herein below.

The user space 224 stores code that may be implemented and deployed by a user of the BMC 132. In the particular embodiment shown, the user space 224 stores a custom BMC firmware stack 230, one or more vendor supplied APPs 232, and one or more user APPs 234. In general, the vendor supplied APPs 232 and user APPs 234 each include executable code for performing functionality in support of the BMC 132. The vendor supplied APPs 232 differ from the user APPs 234, however, in that the vendor supplied APPs 232 include those provided by a vendor of the IHS 100, while the user APPs 234 include those that are implemented by personnel other than the vendor of the IHS 100. Certain user APPs 234 may be configured to perform certain functions in support of the custom BMC firmware stack 230. In one embodiment, the vendor supplied APPs 232 may be associated with an online assistance service, such as the INTELLIGENT ADVISOR online support service provided by DELL TECHNOLOGIES. For example, the INTELLIGENT ADVISOR online support service may provide the vendor supplied APPs 232 as downloadable components that can be added to, upgraded, or removed from the BMC 132 through the INTELLIGENT ADVISOR online support service portal. Although the present embodiment describes an online assistance service, it should be appreciated that other embodiments may incorporate a local assistance service, such as one including instructions stored in the baseboard processor memory space 220 and executed by the baseboard processor 202.

While a standard BMC firmware stack may be, for example, an IHS vendor provided firmware stack (e.g., an iDRAC provided by DELL ENTERPRISES), the custom BMC firmware stack 230 may be one created by a user of the IHS, such as one implemented using the openBMC framework. The custom BMC firmware stack 230 may provide out-of-band monitoring and management of the components of the IHS 100. Examples of monitoring functions that the custom BMC firmware stack 230 may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain resources of the IHS 100 on or off, and the like.

The vendor supplied APPs 232 each include executable code for performing at least one function in support of the BMC 132. Examples of such functions may include monitoring CPU temperature and speed, controlling one or more fans in the IHS 100, providing a communication link to an online portal that provides support software and/or help for operating the IHS 100, and the like. In one embodiment, the vendor supplied APPs 232 may provide enhanced functionality to an online assistance service, such as the INTELLIGENT ADVISOR online service. In another embodiment, the vendor supplied APPs 232 may be downloaded from a suitable online portal or directly loaded onto the baseboard processor memory space 220.

The coprocessor 204 is coupled to a coprocessor memory space 240 that stores a bootloader 242, a coprocessor firmware stack 244, and an assistance APP signature manifest file 246. The bootloader 242 is typically stored in a separate partition commonly referred to as a master boot record (MBR). The bootloader 242 may include any type of executable code for launching or booting the custom BMC firmware stack 230 on the BMC 132. In one embodiment, the bootloader 242 includes a Universal boot loader (Das U-Boot), which is provided under an open source license, and is primarily used in embedded processor devices to bootstrap the BMC firmware stack's operating system's kernel.

Coprocessor 204 executes a coprocessor firmware stack 244 that is stored in a coprocessor memory space 240. In one embodiment, the coprocessor memory space 240 is structured to be separate from the baseboard processor memory space 220 so that actions performed by the instructions of the custom BMC firmware stack 230 are not allowed to access and/or do not interfere, either inadvertently or maliciously, with the instructions of the coprocessor firmware stack 244. For example, the baseboard processor memory space 220 may be implemented on a memory device (e.g., an electronic multimedia card (eMMC), an electronic universal flash storage (eUFS), or a low-power double data rate (LPDDR) memory device, etc.) that is discretely separate from another memory device that the coprocessor firmware stack 240 is implemented on. As another example, the baseboard processor memory space 220 and coprocessor memory space 240 may be implemented on a single memory device, while the instructions of the custom BMC firmware stack 230 are inhibited from accessing data and executable code from the coprocessor memory space 240 using known memory access blocking techniques. In some cases, the coprocessor firmware stack 244 may include instructions for configuring those memory access blocking techniques for restricting access to the coprocessor memory space 240 by the custom BMC firmware stack 230.

Custom BMC firmware stacks 230 are typically created by users whose development efforts are not closely controlled by the vendor of the IHS 100 and as such, it may include logic that may not be aware of all of the intricacies of the IHS 100 it is designed to manage. Thus, the coprocessor 204 may be configured with logic for providing out-of-band monitoring of these custom BMC firmware stacks 230 so that, in the event that it causes certain conditions within the IHS 100 to become dangerous for its proper operation, the coprocessor 204 may generate an alert and/or management signal for remediating the dangerous conditions. The coprocessor 204 may be considered to operate out-of-band with respect to the baseboard processor 202 because the actions of the coprocessor 204 function independently or are not controlled by those of the baseboard processor 202. Thus, the coprocessor firmware stack 244 may provide monitoring capabilities over the baseboard processor 202 regardless of what type of logic that it is implemented with. Throughout this disclosure, the terms 'signal' and 'message' may be used interchangeably to mean any informational mechanism transmitted from one component of the system to another.

In general, the custom BMC firmware stack 230 and user APPs 234 are developed and deployed by the user of the IHS 100 and as such are regarded as untrusted because the code's immunity from illicit performance and safety concerns cannot be guaranteed. Accordingly, the user space 224 of the baseboard processor memory space 220 is considered to be untrusted. Additionally, techniques known to exist have enabled illicit access to code stored in the kernel space 222 from algorithms executed in the user space 224. Thus, while being at least partially secured, the kernel space 222 of the baseboard processor memory space 220 should also be considered to be untrusted.

On the other hand, the bootloader 242, coprocessor firmware stack 244, and signature manifest file 246 stored in the coprocessor memory space 240 can be secured from the user space 224 to a relatively good degree, and therefore, the coprocessor memory space 240 can be considered to form a trusted execution environment. As described above, it would be beneficial to ensure that code or data stored in a trusted execution environment is not modified in any way by illicit code executed in the untrusted environment. For example, the IHS vendors would like to have a storage area on each IHS that is accessible by other trusted components in the IHS to store and retrieve runtime data. Examples include logs of warranty violation detection, notification and hardware protection actions, and other resources such as configuration files that can be consumed or accessed by certain resources of the IHS. The resources of the IHS and/or BMC that utilize such secure data can be construed to form a trusted execution environment that can be used to securely retrieve and authenticate the runtime data generated in response to running the custom BMC firmware stack 230 and the user APPs 234 when required.

Although FIG. 2 describes one example of a BMC 132 that may be used to implement the trust verification system, the features of the disclosed BMC 132 may be embodied in other specific forms without deviating from the spirit and scope of the present disclosure. For example, the BMC 132 may have additional, fewer, or different components than those operations as described in the present example. In a particular example, the BMC 132 may be void of any controller chip 206 if not needed or desired. Additionally, the controller chip 206 may be configured on the IHS 100 external to the BMC 132.

Figure 3:
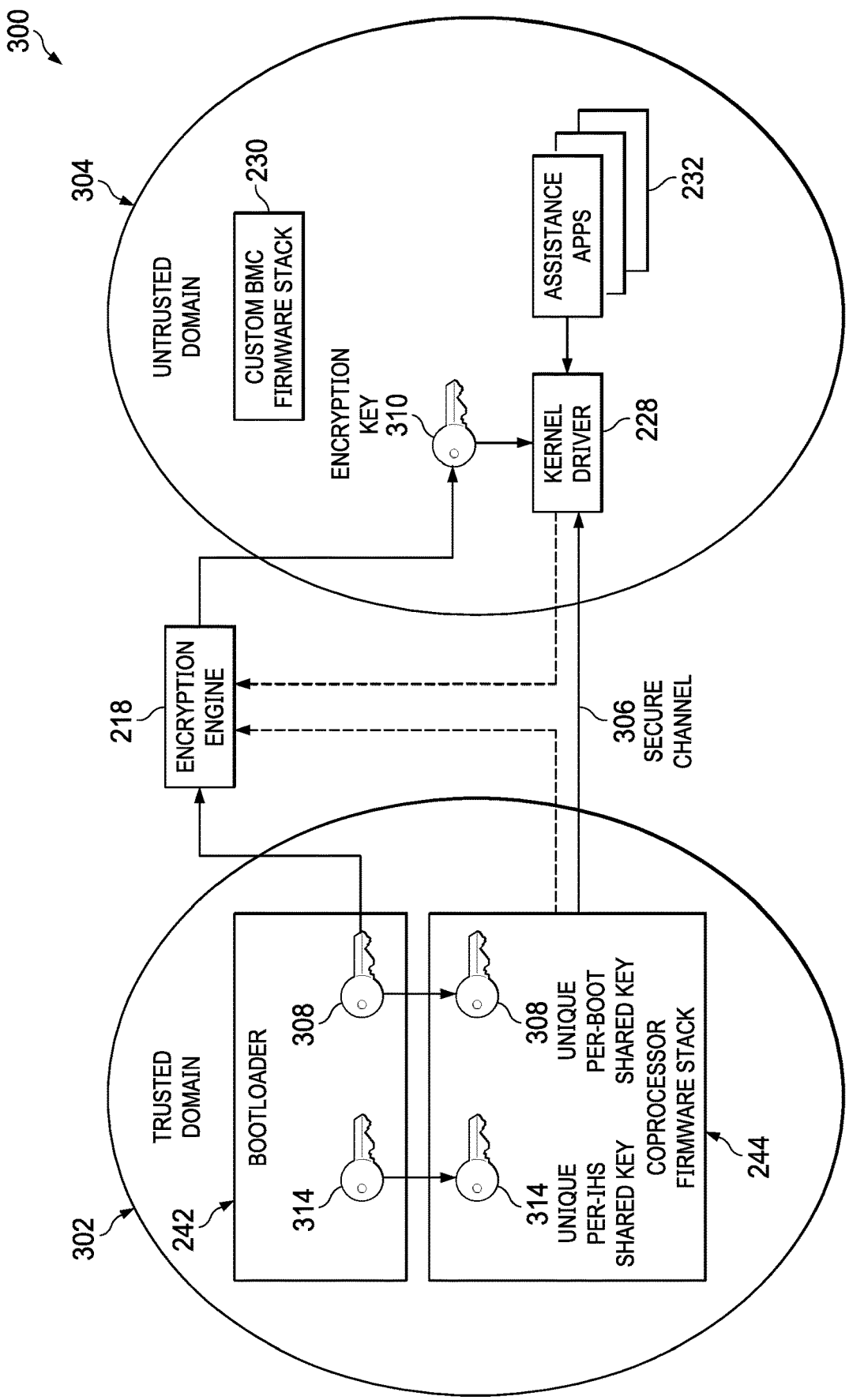
FIG. 3 shows a diagram illustrating how a security level of a trusted domain and an untrusted domain may be maintained according to one embodiment of the present disclosure.

FIG. 3 shows a diagram illustrating how a security level of a trusted domain 302 and an untrusted domain 304 may be maintained according to one embodiment of the present disclosure. The trusted domain 302 generally includes the bootloader 242 and the coprocessor firmware stack 244. The untrusted domain 304 includes the kernel driver 228 and assistance APPs 232, and may also include a custom BMC firmware stack 230 that has been loaded or installed on the BMC 132.

As described above, the trusted domain 302 is generally more secure for various reasons, such as a relatively tighter coupling between the development of the BMC firmware stack and the host IHS in which it is deployed; a feature that a custom BMC firmware stack cannot inherently possess. Nevertheless, use of the custom BMC firmware stack 230 should not reduce the native security level of the trusted domain 302, nor of the host IHS 100 on which it is implemented. To accomplish this, a secure channel 306 is established between the coprocessor firmware stack 244 and kernel driver 228 using a unique per-boot shared key 308 that is shared by the coprocessor firmware stack 244 and kernel driver 228. The per-boot shared key 308 is updated each time the BMC 132 is re-booted. That is, per-boot shared key 308 generally refers to one that is unique to each re-boot session of the BMC 132. In one embodiment, the per-boot shared key 308 may comprise a handover root key (HRK) that is generated using a unique identifier (e.g., serial number) of the BMC 132 so that the derived HRK is unique to each BMC 132 on which it is implemented.

The per-boot shared key 308 is provided to the coprocessor firmware stack 244 directly. However, the per-boot shared key 308 is not provided directly to the kernel driver 228 because it exists in the untrusted domain 304. Rather, the per-boot shared key 308 is provided to the hardware encryption engine 218 that generates a derived key 310 that is provided for use by the kernel driver 228. Thus, the untrusted domain 304 is not provided with direct access to the per-boot shared key 308, thus alleviating the potential problem of the key 308 being hacked by any malicious algorithms. Thus, the security of the trusted domain 302 is maintained in spite of any nefarious actions that could potentially be taken by the custom BMC firmware stack 230.

The bootloader 242 may also store a unique per-IHS shared key 314 that is provided for use by the coprocessor firmware stack 244, but not to anything in the untrusted domain 304. The unique per-IHS shared key 314 generally refers to one that is unique to the IHS 100 in which the BMC 132 is configured. Such as per-IHS shared key 314 may be used, for example, to include a digital signature of an administrator of the IHS 100 so that any logfiles generated in conjunction with the use of the BMC 132 may be attestable to the administrator of the IHS 100. The administrator may be any entity that oversees, guarantees, or warranties the operation of the IHS 100 and/or BMC 132, such as a vendor that assembled, manufactured, sold, or otherwise provided the IHS 100 and/or BMC 132 to the user. For example, the BMC 132 may be configured to continually log events during its operation in which the logged events may be stored in a logfile for retrieval and analysis at a later point in time. In one embodiment, the logged events may be retrieved remotely, such as using network 124 via network interface device 122. Thus, the administrator may be provided with the ability to properly administer warranty policies or other contractual agreements(s) for the IHS 100 based on the manner in which the IHS 100 was used by the user due to the integrity of the trusted domain 302 provided by the per-IHS shared key 314.

Figure 4:
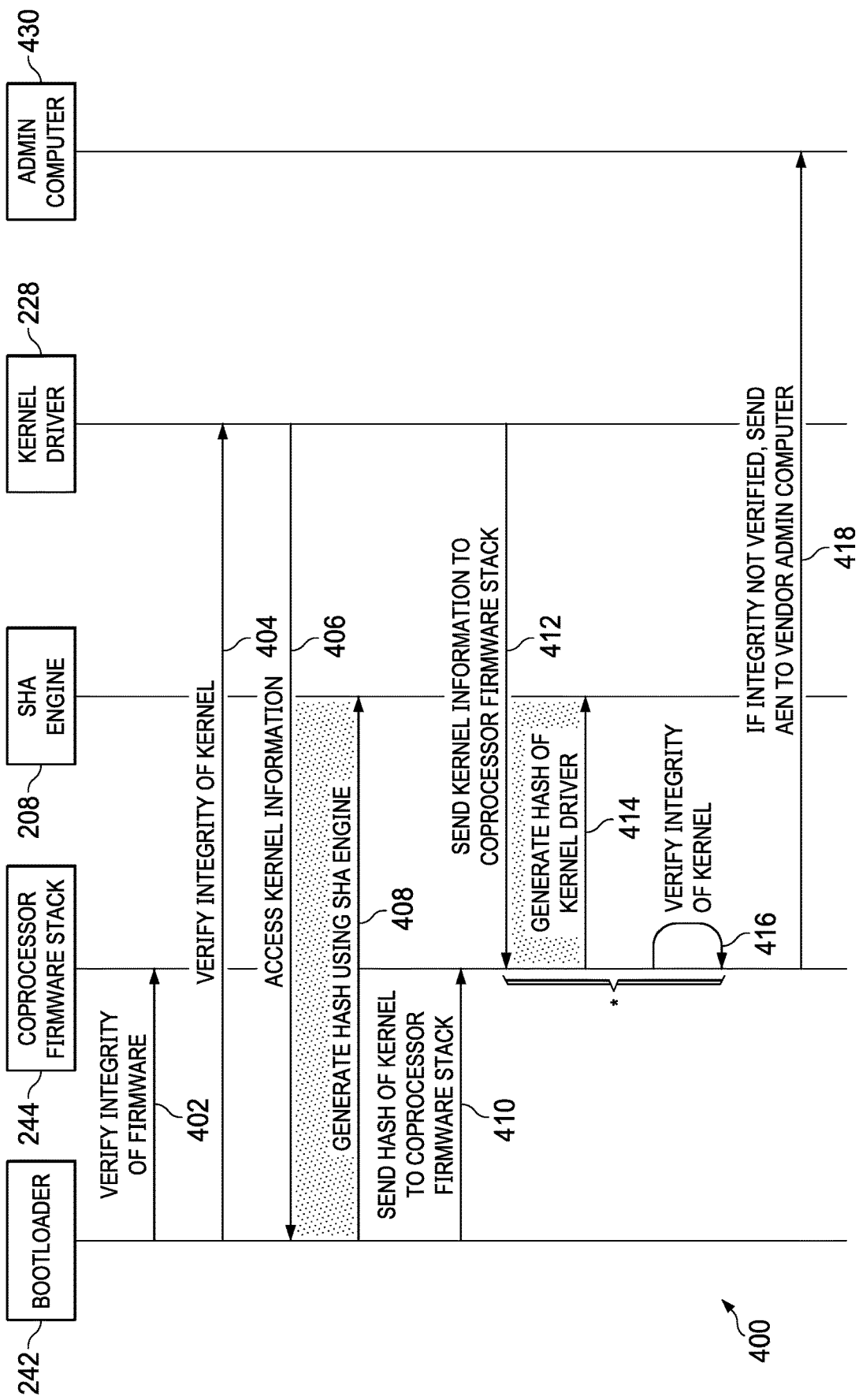
FIG. 4 illustrates an example trust verification method that may be performed to provide a trusted execution environment for the coprocessor firmware stack and kernel driver in the BMC according to one embodiment of the present disclosure.

FIG. 4 illustrates an example trust verification method 400 that may be performed to provide a trusted execution environment for the coprocessor firmware stack 244 and kernel driver 228 in the BMC 132 according to one embodiment of the present disclosure. In one embodiment, the method 400 may be performed each time the BMC 132 is initially booted after the BMC 132 is powered on, such as when its associated host IHS 100 is re-booted.

At step 402, the bootloader 242 verifies the integrity of the coprocessor firmware stack 244. For example, the bootloader 242 may perform a hash function of a block of memory comprising the coprocessor firmware stack 244 stored in the coprocessor memory space 240, and compare that value against a previously generated hash value of the block of memory to ensure that the coprocessor firmware stack 244 has not be modified. Thereafter at step 404, the bootloader 242 verifies the integrity of the kernel driver 228 using an at least somewhat similar technique used to verify the integrity of the coprocessor firmware stack 244 at step 402. Thus at this point, the coprocessor firmware stack 244 and kernel driver 228 is initially verified and the coprocessor firmware stack 244 completes its booting procedures and begins functioning in normal execution mode. Thus as can be seen, the bootloader 242 functions as a trusted code anchor from which other components can be verified for their integrity throughout the operation of the BMC 132.

At step 406, the bootloader 242 accesses information from the kernel driver 228, and at step 408, it generates a hash value of the kernel driver 228. In one embodiment, the bootloader 242 uses the SHA engine 208 to generate the hash value. Certain embodiments may provide an advantage in that offloading the generation of the hash value to an external component, such as the SHA engine 208, may reduce the processing load required by the coprocessor 204, which is often limited in its computing performance. For example, many cps 204 provided on BMCs often have a clock speed of less than 200 MHz, and are allocated with a memory space of less than 64 kilo-bytes of RAM. Thus, using an external component to generate the hash value may save the coprocessor 204 from what would otherwise unduly encumber its already limited resources. Although the present embodiment describes the use of a SHA engine for verifying the integrity of the kernel driver 228, it should be appreciated that other embodiments may use other hash functions, such as the digital signature algorithm (DSA), or a cyclic redundancy check (CRC) algorithm without departing from the spirit and scope of the present disclosure.

At step 410, the bootloader 242 sends the generated hash value to the coprocessor firmware stack 244. At this point, the coprocessor firmware stack 244 and kernel driver 228 have been booted on the coprocessor 204 and baseboard processor 202, respectively, and are operating in the normal manner. The coprocessor firmware stack 244 now stores the hash value for the kernel driver 228 and can now verify the integrity of the kernel driver 228 during its runtime. That is, the task of verifying the integrity of the kernel driver 228 has been passed from the bootloader 242 to the coprocessor firmware stack 244 as long as it continues in the normal execution mode.

Steps 412-418 describe a sequence of actions that are performed at ongoing intervals (e.g., periodically, asynchronously due to a triggering event, etc.) to verify the integrity of the kernel driver 228. As mentioned above, although the kernel driver 228 is stored in the kernel space 222 that should ordinarily be secure from processes running in the user space 224, scenarios exist in which the kernel space 222 can become compromised. Due to this problem, the kernel driver 228 may be checked for its integrity at ongoing intervals to ensure that it remains trusted. For example, the steps 412-418 may be performed at periodic intervals (e.g., every 30 minutes, every 24 hours, etc.). For another example, the steps 412-418 may be performed in response to a triggering event, such as a page fault, segmentation fault, or other exception that is caused by bugs or software faults existing in the executable code. In some embodiments, the results of the trust verification step may be included with an event notification (e.g., asynchronous event notification) sent to an administrative management computer (e.g., IHS vendor support site) as a result of a fault event that has occurred with the IHS 100 and/or BMC 132.

At step 412, the coprocessor firmware stack 244 accesses information from the kernel driver 228, and at step 414, it generates a hash value of the kernel driver 228 using the SHA engine 208. In one embodiment, the coprocessor firmware stack 244 accesses the information through a secure channel that is inaccessible from code executed in the user space 224, such as the custom BMC firmware stack 230, or user APPs 234. Thereafter at step 416, the coprocessor firmware stack 244 verifies the integrity of the kernel driver 228 by comparing the hash value obtained at step 408 with that obtained at step 414. If the kernel driver 228 has been verified, the method 400 waits for the next ongoing interval to again verify the integrity of the kernel driver 228. Otherwise, if the kernel driver 228 fails the integrity verification test, the coprocessor firmware stack 244 may generate an event notification that is transmitted to an administrative computer 430. In one embodiment, the coprocessor firmware stack 244 may generate an asynchronous event notification (AEN) that is sent to the BMC 132, which in turn, may store information associated with the event in a logfile and/or transmit information associated with the AEN to an administrator computing device, such as a computing device (e.g., system management console) managed by a vendor of the IHS 100 who warranties the operation of the IHS 100.

The method 400 described above may be repeatedly performed each time the BMC 132 is re-booted. Nevertheless, when use of the method 400 is no longer needed or desired, the method 400 ends.

Figure 5:
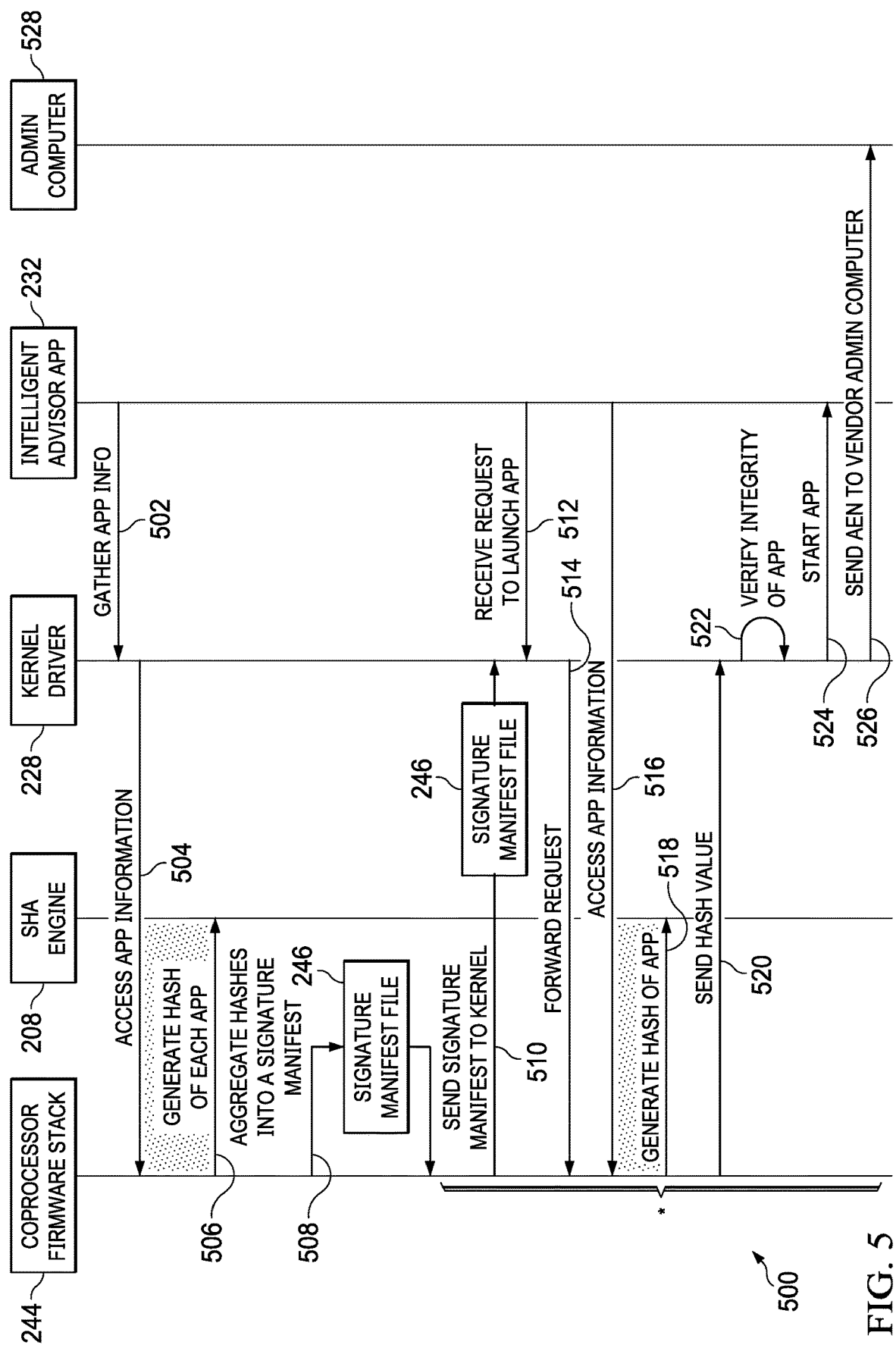
FIG. 5 illustrates an example trust verification method that may be performed to provide a trusted execution environment for vendor supplied APPs used in the BMC according to one embodiment of the present disclosure.

FIG. 5 illustrates an example trust verification method 500 that may be performed to provide a trusted execution environment for vendor supplied APPs 232 used in the BMC 132 according to one embodiment of the present disclosure. In one embodiment, the method 500 may be performed each time an assistance APP 232 is called or launched by the online assistance service or by the kernel driver 228. Initially, the IHS 100 and BMC 132 has been booted and the coprocessor firmware stack 244 and kernel driver 228 verified for their integrity, such as described above with reference to FIG. 3. Additionally, the kernel driver 228 is started. In one embodiment, the kernel driver 228 may be started in response to a signal received from the bootloader 242 indicating that the integrity verification test performed during processing of the method 300 described above was completed successfully.

At step 502, the kernel driver 228 gathers information about the vendor supplied APPs 232 stored in the BMC 132. Although only one assistance APP 232 is shown herein, it should be appreciated that the BMC 132 may, and often does, store and use multiple vendor supplied APPs 232. At step 504, the coprocessor firmware stack 244 accesses APP information from the kernel driver 228, and generates a hash value for each assistance APP 232 stored in the user space 224 using the SHA engine 208 at step 506. Thereafter at step 508, the coprocessor firmware stack 244 aggregates the generated hash values for each of the vendor supplied APPs 232 into a signature manifest file 246. At step 510, the coprocessor firmware stack 244 sends the signature manifest file 246 to the kernel driver 228, which stores it in the baseboard processor kernel memory space 222. At this point, the kernel driver 228 has access to the hash value of the vendor supplied APPs 232 that are stored in the BMC 132.

Steps 512-526 describe a sequence of actions that are performed each time an assistance APP 232 is started on the BMC 132 to verify its integrity. That is, the integrity of the vendor supplied APPs 232 are verified using a trusted execution environment each time they are started on the BMC 132. Certain embodiments of the present disclosure may provide an advantage in that the previously generated hash values for each assistance APP 232, which is made easily available via the signature manifest file 246, provides a relatively quick and efficient technique for verifying the integrity of the vendor supplied APPs 232 so that their integrity may be checked "on the fly" as they are being started.

At step 512, the kernel driver 228 receives a request to start the assistance APP 232. As shown, the request is received from the assistance APP 232 itself. In other embodiments, the request may originate from any suitable source, such as through an administrative terminal that generates the request in which the request includes identifying information associated with the assistance APP 232. At step 514, the kernel driver 228 forwards the request to the coprocessor firmware stack 244 which in turn, accesses the assistance APP 232 via the kernel driver 228 at step 516, to generate a hash value for the assistance APP 232 at step 518. Thereafter at step 520, the generated hash value is sent to the kernel driver 228.

At step 522, the kernel driver 228 verifies the integrity of the assistance APP 232 by comparing the received hash value with that stored in the signature manifest file 246. If the assistance APP 232 has been verified, the kernel driver 228 allows the assistance APP 232 to be started on the BMC 132 at step 524. Otherwise, if the kernel driver 228 fails the integrity verification test, the kernel driver 228 may generate an event notification (e.g., AEN) that is transmitted to an administrative computer 528. In one embodiment, the kernel driver 228 may notify the BMC 132 through the coprocessor firmware stack 244 that an event has occurred so that the BMC 132 can notify the administrative computer 528.

Although FIGS. 4 and 5 each describe an example of a method that may be performed to verify the integrity of certain relevant components of the BMC 132 for forming a trusted execution environment, the features of the disclosed process may be embodied in other specific forms without deviating from the spirit and scope of the present disclosure. For example, either of method 400 and/or method 500 may perform additional, fewer, or different operations than those operations as described in the present example. As another example, certain steps of the aforedescribed methods may be performed by other components of the BMC 132 and/or IHS 100, such as by certain processes other than the bootloader 242 executed on the BMC 132 or its host IHS 100.

Figure 6:
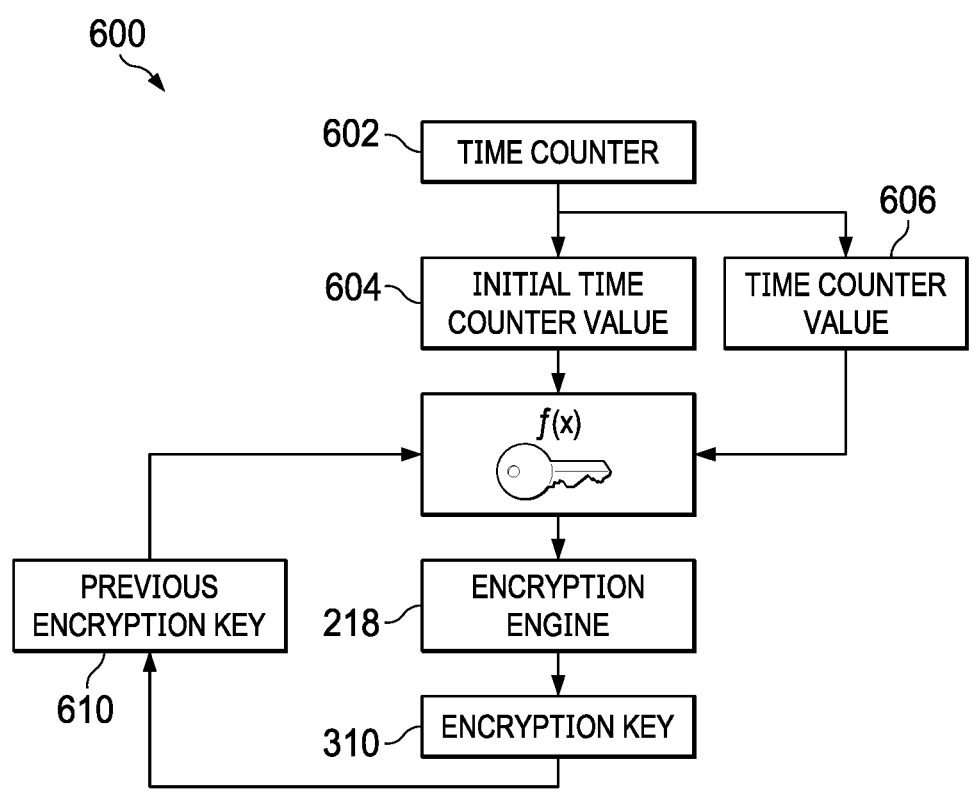
FIG. 6 illustrates a diagram showing how an encryption key may be generated for maintaining the secure communication channel according to one embodiment of the present disclosure.

FIG. 6 illustrates a diagram 600 showing how an encryption key 310 may be generated for maintaining the secure communication channel 306 according to one embodiment of the present disclosure. The encryption key 602 is generated by the encryption engine 218 that is available for use by both the coprocessor 204 and baseboard processor 202. In one embodiment, the encryption engine 218 comprises a hardware component of the SoC in which the baseboard processor 202 and coprocessor 204 are configured. In another embodiment, the encryption engine 218 comprises an advanced encryption standard (AES) encryption engine.

The encryption engine 218 may generate the encryption key 310 as a function of one or more input values. As shown, one input value that may be used to generate the encryption key 310 includes a time counter 602 that generates an initial time counter value 604 and multiple, ongoing time counter values 606. The time counter 602 may comprise any suitable mechanism that generates a counter value that is incremented at ongoing time-based intervals, such as one that increments the counter value once each second. In one embodiment, the time counter 602 comprises a hardware component of the SoC in which the baseboard processor 202 and coprocessor 204 are configured.

After the BMC 132 has been booted, the time counter 602 generates the initial time counter value 604 that is used by the encryption engine 218 to generate an initial encryption key 310. In one embodiment, the initial time counter value 604 provided by the time counter 602 may be set to a random non-zero value. In this manner, would be intruders would be thwarted from guessing the encryption key 310 by presuming that the initial counter value 604 would by convention, start at zero, which is does not.

After a specified period of time (e.g., 1 day), the encryption engine 218 may use the current time counter value 606 to generate the next encryption key 310. The encryption engine 218 may continue this process to continually update the encryption key 310 at each successive period of time. In one embodiment, the encryption engine 218 may also generate the encryption key 310 as a function of the previous encryption key 610. That is, when the encryption engine 218 updates the encryption key 310, the currently existing encryption key 310 becomes the previous encryption key 610 that may be further utilized to obfuscate the resulting encryption key 310 generated thereby. Thus, randomness of the encryption key 310 may be enhanced by basing the encryption of the encryption key 310 on successive randomized values ad infinitum in some embodiments.

Thus as described above, the encryption key 310 may be encrypted to a level that allows the kernel driver 228 to remain trusted, even when operating in an untrusted domain. Embodiment of the present disclosure that utilizes a time counter 602 may provide one or more advantages not heretofore recognized by prior art encryption systems. For example, the encryption key 310 is encrypted with a time counter 602 that that further obfuscates or randomizes the resulting encryption key 310. Furthermore, the time counter 602 is known by the coprocessor 204 operating in the trusted domain 302 and by the baseboard processor 202 operating in the untrusted domain 304. Thus, the time counter 602 may be used by both the coprocessor 204 and baseboard processor 202 to encrypt and decrypt communications in the secure communication channel 306 with a relatively high degree of randomness using a time counter 602 that generally comprises a readily available component of modern day SoCs.

Additionally, the encryption key 310 is derived from a per-boot key 308 that is obtained from a single storage source, thus alleviating any attestation issues associated with those root keys whose root source may not be easily traced to its origin, particular when analyzing the logfiles of the BMC 132 forensically. In one embodiment, the single storage source for the per-boot key 308 may be the bootloader 242 that is relatively impervious to being hacked by would-be intruders. In another embodiment, the per-boot key 308 may be stored in a write only register in the bootloader 242.

Figure 7:
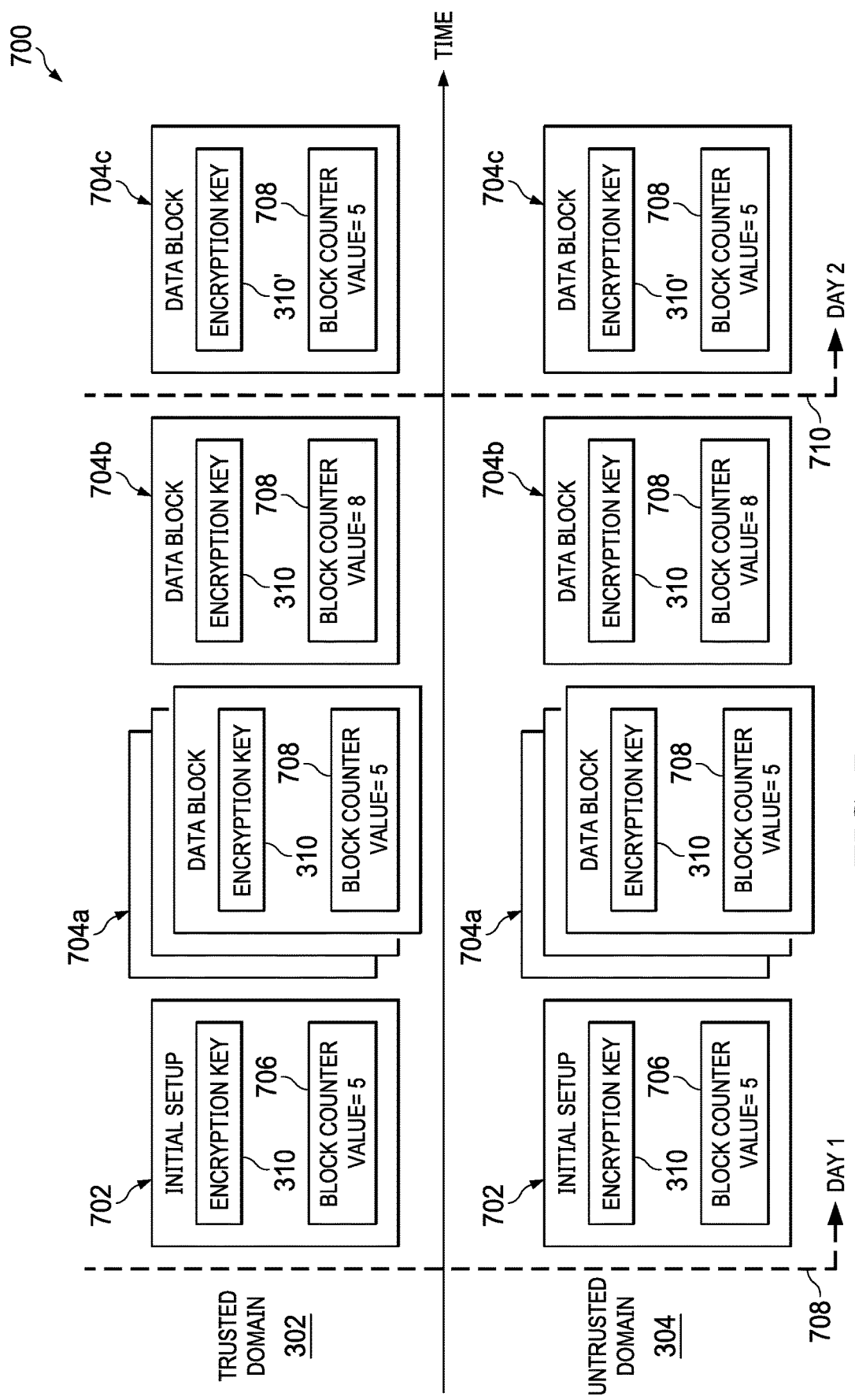
FIG. 7 illustrates a time counter-based encryption process showing how communications may be conveyed through the secure communication channel according to one embodiment of the present disclosure.

FIG. 7 illustrates a time counter-based encryption process 700 showing how communications may be conveyed through the secure communication channel 306 according to one embodiment of the present disclosure. The actions of the trusted domain 302 may be performed, at least in part, by the coprocessor 204 of the BMC 132, while the actions of the untrusted domain 304 may be performed, at least in part, by the baseboard processor 202. Block 702 represents an initialization process that may be performed by the baseboard processor 202 and coprocessor 204. For example, both the baseboard processor 202 and coprocessor 204 may generate a first encryption key 310 using an initial counter value 604 provided by the time counter 602.

The encryption key 310 may be further encrypted using ongoing block counter values 708. In general, the block counter value 708 comprises a value that is incremented with each block of data conveyed through the secure communication channel 306, while the initial block counter value 706 that is generated during the initialization block 702 comprises a random, non-zero value, which in this particular example embodiment, is set to the value of '5'.

Ensuing blocks 704 *a-c* represent data blocks that have been split from a communication message conducted between the trusted domain 302 and the untrusted domain 304. Blocks 704*a* represent a total of three data blocks that are conveyed between the trusted domain 302 and the untrusted domain 304. The first of those three blocks have a block counter value of '5' to indicate that it is the first data block sent after being initialized at block 702. Block 704*b*, on the other hand, has a block counter value of '8' to indicate that its associated data block 704*b* is the eighth data block sent minus the initial counter value (e.g., '3') assigned during initialization.

Block 704*c* represents a data block that is conveyed between the trusted domain 302 and untrusted domain 304 after a specified update time 710, which in this particular example is each day. The specified update time 710 generally refers to an elapsed period of time in which the encryption engine 218 updates the encryption key 310 as described above with reference to FIG. 6. Any suitable elapsed period of time may be used. In one embodiment, the encryption key 310 may be updated every 24 hour time period (i.e., each day). Additionally as shown, the block counter value has been reset to the initial block counter value of '5'.

Figure 8:
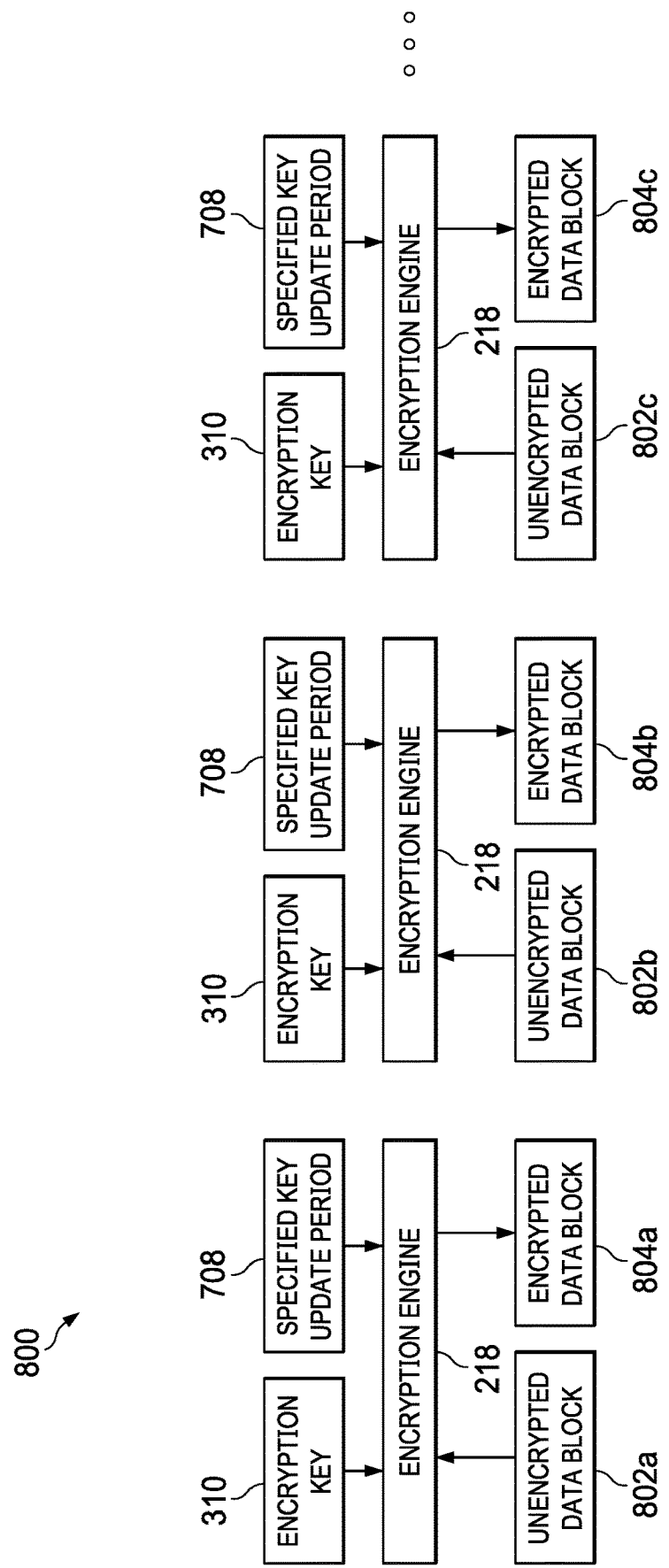
FIG. 8 illustrates an example data block-based encryption process showing how the initial block counter value and block counter values may be used to encrypt several data blocks according to one embodiment of the present disclosure.

FIG. 8 illustrates an example data block-based encryption process 800 showing how the initial block counter value 706 and block counter values 708 may be used to encrypt several data blocks 704 a-c according to one embodiment of the present disclosure. In particular, the process 800 shows how three successive data blocks 704 may be further encrypted using the block counter values as described above with reference to FIG. 7. Here, the data blocks 704 a-c are denoted as unencrypted data blocks 802 a-c and encrypted data blocks 804 a-c.

The first data block 704a is encrypted by the encryption engine 218 using the encryption key 310 and a first block counter value 708. The encryption key 310 is shared between the trusted domain 302 and the untrusted domain 304. The block counter value 708 is known by both the trusted domain 302 and the untrusted domain 304 because they both maintain a counter that indicates the quantity of unencrypted data blocks 802 a-c that are encrypted and transmitted through the secure communication channel 306, thus providing secure communication of the encrypted data block 804a.

The second unencrypted data block 802b is encrypted by the encryption engine 218 using the encryption key 310 and a second block counter value 708 to create an encrypted data block 804b that is transmitted through the secure communication channel 306. The second block counter value 708 comprises the block counter value 708 used to encrypt the first unencrypted data block 802a incremented by '1'. The third unencrypted data block 802c is encrypted by the encryption engine 218 using the encryption key 310 and a third block counter value 708 to create an encrypted data block 804c that is transmitted through the secure communication channel 306. The third block counter value 708 comprises the block counter value 708 used to encrypt the second unencrypted data block 802b incremented by '1'. The process is repeatedly performed for each new unencrypted data block 802n to be transmitted through the secure communication channel 306.

Although FIGS. 7 and 8 each describe processes that may be performed to provide a secure communication channel 306, the features of the disclosed process may be embodied in other specific forms without deviating from the spirit and scope of the present disclosure. For example, either of processes 700 or 800 may perform additional, fewer, or different operations than those operations as described in the present example. As another example, the actions of either of the processes 700 or 800 may be performed in combination or independently of one another.

As can be seen from the foregoing disclosure, embodiments of the present disclosure provide a verification system that leverages the multi-processor SoC provided on most BMCs to provide a trusted execution environment for ensuring the integrity of trusted (e.g., vendor supplied) code on a BMC. The bootloader 242, coprocessor firmware stack 244, and kernel driver 228 comprise a trusted execution environment that is inhibited from access by user-supplied code (e.g., custom BMC firmware stack 230, user APPs 234, etc.) in the user space 224 of the baseboard processor memory space 220. Thus, the bootloader 242, coprocessor firmware stack 244, and kernel driver 228 may include code that continually monitors vendor signed code (e.g., coprocessor firmware stack 244, assistance APPs 234, etc.) to ensure that it is not corrupted by any malicious user-supplied code. Additionally, the bootloader 242, coprocessor firmware stack 244, and kernel driver 228 form a root of trust that originates from the bootloader 242, and is propagated to the coprocessor firmware stack 244, and then to the kernel driver 228. Furthermore, this root of trust is re-established each time the BMC 132 is re-booted, thus minimizing any possibility of the root of trust being compromised.

Verification of trust may be accomplished using an onboard SHA engine that effectively offloads the inherently limited processing resources from the coprocessor 204. Additionally, use of the SHA engine alleviates the need for more process intensive encryption algorithms, such as elliptic-curve cryptography (ECC) or Rivest-Shamir-Adleman (RSA) cryptographic algorithms that would otherwise be required to ensure that the trusted execution environment remains secure.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information handling system (IHS) comprising:
a plurality of hardware devices; and
a baseboard management controller (BMC) in communication with the plurality of hardware devices, the BMC comprising a plurality of processors and one or more memory units including instructions that, upon execution by the processors, are executed to:
execute a bootloader to verify an integrity of a first firmware stack, and boot the first firmware stack on a first of the processors; and
execute the first firmware stack to verify the integrity of a first code segment,
wherein the first code segment is executed on a second of the one or more processors,
wherein the first code segment is associated with an online assistance service managed by a vendor of the BMC, the online assistance service is executed to monitor the operations of the custom BMC firmware stack;
wherein the second processor is configured to execute a custom BMC firmware stack, and
wherein the first code segment is executed to verify the integrity of one or more vendor supplied code segments executed on the second processor.

2. The IHS of claim 1, wherein the first processor comprises a coprocessor and the second processor comprises a baseboard processor, the coprocessor and baseboard processor configured in a system on chip (SoC) device.

3. The IHS of claim 2, wherein the first firmware stack is executed on the first processor to verify the integrity of the first code segment using a hash algorithm engine configured on the SoC device.

4. The IHS of claim 1, wherein the first code segment comprises a kernel driver stored in a kernel space of the second processor.

5. The IHS of claim 1, wherein the first firmware stack, first code segment, and bootloader comprise a trusted execution environment that is inhibited from access by the custom BMC firmware stack.

6. The IHS of claim 1, wherein the vendor supplied code segments comprise applications (APPs) that are configured to be downloaded from the online assistance service.

7. The IHS of claim 1, wherein the first code segment is executed on the second processor to verify the integrity of the vendor supplied code segments each time they are started on the BMC.

8. The IHS of claim 1, wherein the first firmware stack is executed on the first processor to verify the integrity of the first code segment at ongoing intervals.

9. The IHS of claim 1, wherein the first firmware stack is executed on the first processor to send an event notification message to an administrative computer associated with the IHS when the verification fails.

10. A trust verification method comprising:
executing, using instructions stored in at least one memory and executed by a plurality of processors, a bootloader to verify an integrity of a first firmware stack on a baseboard management controller (BMC), and boot the first firmware stack on a first of the processors; and
executing, using the instructions, the first firmware stack to verify the integrity of a first code segment,
wherein the first code segment is executed on a second of the processors,
wherein the first code segment is associated with an online assistance service managed by a vendor of the BMC, the online assistance service is executed to monitor the operations of the custom BMC firmware stack;
wherein the second processor is configured to execute a custom BMC firmware stack, and
wherein the first code segment is executed to verify the integrity of one or more vendor supplied code segments executed on the second processor.

11. The trust verification method of claim 10, further comprising executing, by the first firmware stack, to verify the integrity of the first code segment using a hash algorithm engine configured on the SoC device.

12. The trust verification method of claim 10, further comprising inhibiting access to the first firmware stack, the first code segment, and the bootloader from access by the custom BMC firmware stack, the first firmware stack, the first code segment, and the bootloader comprising a trusted execution environment.

13. The trust verification method of claim 10, further comprising downloading the vendor supplied code segments from the online assistance service, wherein the vendor supplied code segments comprise applications (APPs).

14. The trust verification method of claim 10, further comprising executing the first code segment to verify the integrity of the vendor supplied code segments each time they are started on the BMC.

15. The trust verification method of claim 10, further comprising executing the first firmware stack on the first processor to verify the integrity of the first code segment at ongoing intervals.

16. The trust verification method of claim 10, further comprising executing the first firmware stack on the first processor to send an event notification message to an administrative computer associated with the IHS when the verification fails.

17. A baseboard management controller (BMC) comprising:
a baseboard management controller (BMC) in communication with a plurality of hardware devices of an information handling system (IHS), the BMC comprising a plurality of processors and one or more memory units including instructions that, upon execution by the processors, are executed to:
execute a bootloader to verify an integrity of a first firmware stack, and boot the first firmware stack on a first of the processors; and
execute the first firmware stack to verify the integrity of a first code segment,
wherein the first code segment is executed on a second of the processors,
wherein the first code segment is associated with an online assistance service managed by a vendor of the BMC, the online assistance service is executed to monitor the operations of the custom BMC firmware stack;
wherein the second processor is configured to execute a custom BMC firmware stack, and
wherein the first code segment is executed to verify the integrity of one or more vendor supplied code segments executed on the second processor.

18. The BMC of claim 17, wherein the first code segment comprises a kernel driver stored in a kernel space of the second processor, wherein the first code segment is executed on the second processor to verify the integrity of the vendor supplied code segments each time they are started on the BMC, and wherein the first firmware stack is executed on the first processor to verify the integrity of the first code segment at ongoing intervals.

* * * * *

UNITED STATES PATENT AND TRADEMARK OFFICE
CERTIFICATE OF CORRECTION

| | |
|---|---|
| PATENT NO. | : 11,797,679 B2 |
| APPLICATION NO. | : 17/386779 |
| DATED | : October 24, 2023 |
| INVENTOR(S) | : Eugene David Cho et al. |

It is certified that error appears in the above-identified patent and that said Letters Patent is hereby corrected as shown below:

In the Claims

In Column 17 Line 15, Claim 1, delete "of the one or more processors," and insert --of the processors,-- therefor.

Signed and Sealed this
Twenty-first Day of November, 2023

Katherine Kelly Vidal
*Director of the United States Patent and Trademark Office*